(12) United States Patent
Hansen

(10) Patent No.: US 8,839,424 B2
(45) Date of Patent: Sep. 16, 2014

(54) CROSS-SITE REQUEST FORGERY PROTECTION

(71) Applicant: Robert Hansen, Austin, TX (US)

(72) Inventor: Robert Hansen, Austin, TX (US)

( * ) Notice: Subject to any disclaimer, the term of this patent is extended or adjusted under 35 U.S.C. 154(b) by 61 days.

(21) Appl. No.: 13/678,274

(22) Filed: Nov. 15, 2012

(65) Prior Publication Data
US 2014/0137189 A1  May 15, 2014

(51) Int. Cl.
*G06F 9/00* (2006.01)
*G06F 11/00* (2006.01)

(52) U.S. Cl.
USPC ............... 726/22; 726/13; 726/23; 726/25

(58) Field of Classification Search
USPC ..................................... 726/25, 13, 22, 23
See application file for complete search history.

(56) References Cited

U.S. PATENT DOCUMENTS

| | | | | |
|---|---|---|---|---|
| 7,343,626 | B1 * | 3/2008 | Gallagher | 726/25 |
| 8,413,326 | B2 * | 4/2013 | Iwagami et al. | 29/888.01 |
| 2009/0119769 | A1 * | 5/2009 | Ross et al. | 726/13 |
| 2010/0088761 | A1 * | 4/2010 | Podjarny et al. | 726/22 |
| 2010/0100927 | A1 * | 4/2010 | Bhola et al. | 726/1 |
| 2011/0055391 | A1 * | 3/2011 | Schneider | 709/225 |
| 2012/0090026 | A1 * | 4/2012 | Andrews et al. | 726/22 |
| 2012/0180129 | A1 * | 7/2012 | Shulman et al. | 726/22 |

* cited by examiner

*Primary Examiner* — Mohammad W Reza
(74) *Attorney, Agent, or Firm* — Mark R. Hennings

(57) ABSTRACT

A cross-site request forgeries (CSRF) protection system helps protect against cross-site request forgeries attacks. A CSRF protector is arranged to receive a signal from a service provider that notifies a browser running on a potential victim consumer machine to selectively permit and/or deny cross-site requests in accordance with a set of one or more security policies. The policies can be selected and applied on a domain name basis, IP address basis, trusted zone basis, and combinations thereof. The CSRF protector can also provide a context of the event that triggers a request that contains a cross-site request, where the context provides indicia of circumstances that indicate a likelihood of a cross-site request forgery is being attempted.

30 Claims, 6 Drawing Sheets

CROSS-SITE REQUEST FORGERY PROTECTION

BACKGROUND

Network-enabled applications are applications that use communication networks to share information between various devices, each of which might be operated by the same or different user(s). The network-enabled applications include applications such as browser engines, messaging interfaces, e-mail tools, remote desktops, and the like that allow users to easily browse, select, and manipulate items being viewed using a network-enabled application. The network-enabled application receives one or more communications (such as code for instantiating webpages) from a service provider that is often encoded in the form of a language (such as the hypertext markup language HTML), which contains elements that describe the structure and functionality of the content that is received by the content user.

The networked-enabled application often involves accessing sensitive information and/or transferring various amounts of currency in computer-accessed financial accounts, for example. Thus, security features such as username/password combination verification are often used to establish a secure session between (for example) a bank and a customer of the bank who is using the networked-enabled application to access bank accounts of the customer.

However, malicious code that might be present in the network-enabled application (and/or computer upon which the network-enabled application is executing) can be used to induce unauthorized commands to be sent that attempt to exploit the security of the secure session. In a cross-site request forgery exploit for example, the trust of the user in the user's network-enabled application is exploited. The cross-site request forgery (often referred to as CSRF, XSRF, a one-click attack, "confused-deputy problem," and/or session riding) exploit operates by inducing the browser by way of HTML or script to (usually unknowingly) access a website that a user has ready accessed (such as being logged in, having an authentication cookie set, an established session identifier, and the like).

The malicious function can be accessed by the user's browser rendering a seemingly valid element (such an image tag) that has a reference to a location that is typically inaccessible by the attacker. When the reference location is visited by the user's browser, the user's browser then executes the malicious function. The malicious function can be used to transmit a request to perform an action on behalf of the attacker using a victim user's own machine. (The performed action can include malicious activity such as transferring funds from the user's bank account to an attacker's bank account.) Thus, attackers can exploit the trust established by a requested site by way of the user's machine having been forced to by the referring site (and/or infected word processing documents, email messages and attachments, chat messages, and the like) to perform the exploit.

DETAILED DESCRIPTION

The following discussion is directed to various exemplary embodiments of the disclosure. Although one or more of these exemplary embodiments may be preferred, the exemplary embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical, optical and/or wireless connection. Thus, if a first device couples to a second device, that connection can be made through a direct connection, or through an indirect connection via other devices and connections.

The term "domain" as used herein refers to either a domain or a portion of the domain ("subdomain") if any. Thus, the term "subdomain" can be used to refer to a portion of the "domain." A subdomain can be, for example, a domain name system (DNS) server record. For example, the name "www.example.com" can be used in a localized context to refer to a domain (notwithstanding the fact that "www.example.com" is itself a subdomain of "example.com"). While net-enabled applications such as browsers follow a "same origin" policy and tend to use the longer version "www.example.com" as an origin domain name, the net-enabled applications also use the shorter version "example.com" for certain purposes (such as for cookies that are set with the domain switch). Thus all subdomains of the domain "example.com" include "no-subdomains" (such as "http://example.com/" and "http://whatever.example.com/") and include the more-specific subdomains (such as www.example.com). The term "render" can be used to describe a change rendered in the logical structure of a Document Object Model (DOM) as well as a graphical rendering of the DOM element. The term "portion" means an entire portion or a portion that is less than the entire portion.

Figure 1:
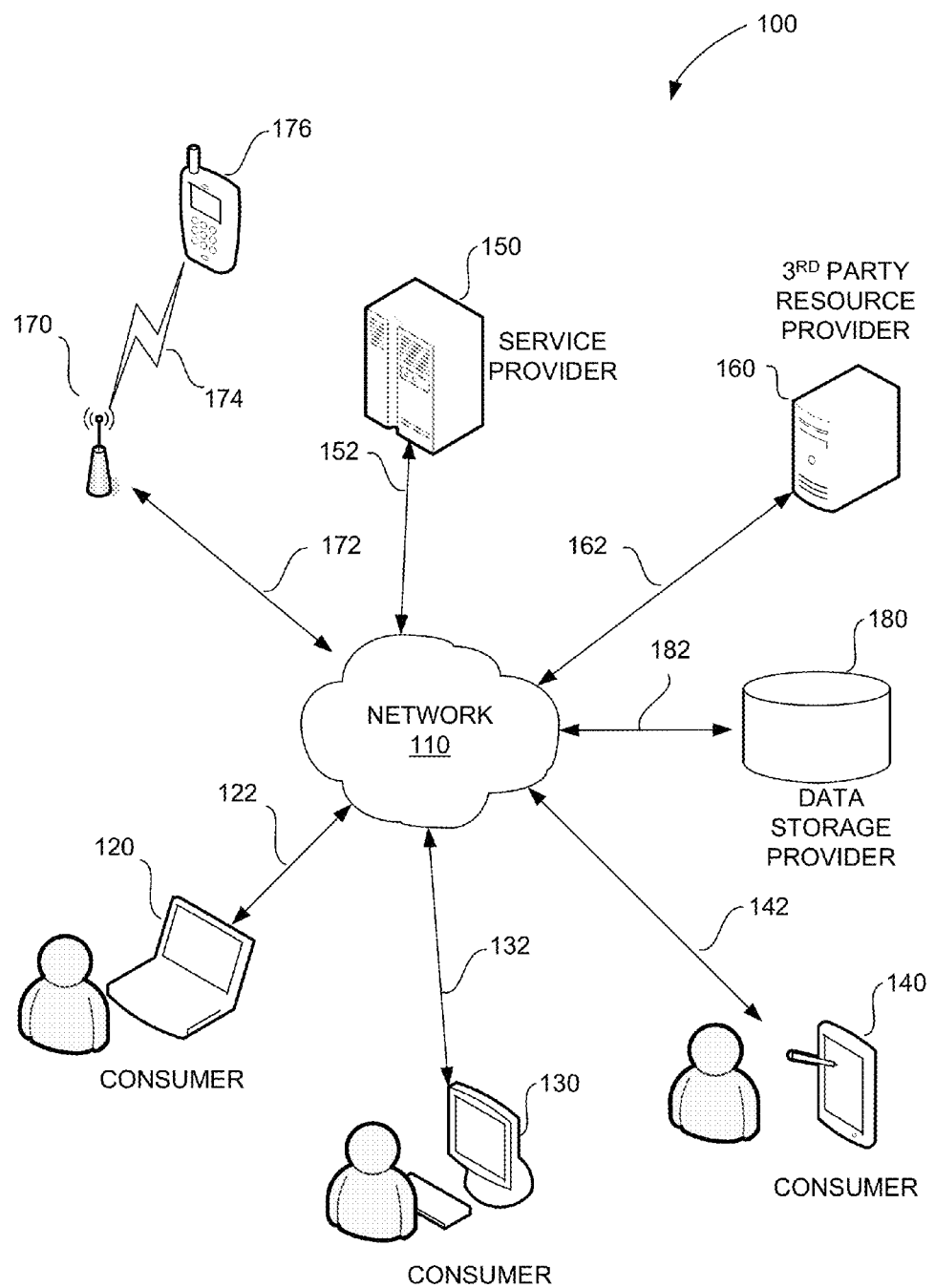
FIG. 1 is a network diagram illustrating a network that is suitable for practicing aspects of cross-site request forgery protection in accordance with exemplary embodiments of the disclosure.

FIG. 1 is a network diagram illustrating a network that is suitable for practicing aspects of cross-site request forgery protection in accordance with exemplary embodiments of the disclosure. Network system 100 includes consumer 120, 130, and 140 (machines, for example), service provider 150, third party resource provider 160, cellular communications provider 170, and data storage provider 180. Consumers 120, 130, and 140 access and communicate with network 110 using communication links 122, 132, and 142 respectively. Each of the consumers 120, 130, and 140 can be (or internally provide functions of) the (illustrative) computing device 200 discussed below with reference to FIG. 2.

Network 110 typically includes a publically accessible network such as the Internet, but other networks (including private networks) can be used. Thus, network 110 is typically a collection of networks (and gateways) that typically use a TCP/IP (transmission control protocol/Internet protocol) suite of protocols for packet-based communications. The Internet typically employs high-speed data communication lines between major nodes or host computers, but even bandwidth between the major nodes is subject to degradation through satellite outages, hardware faults, denial of service attacks, oversubscription of services, and the like. The network connections are shown for the purpose of illustration, and other ways of establishing a communications link between computers (such as using firewalls, as discussed below) can be used.

Consumers 120, 130, and 140 access the network 110 to access networked service providers of services such as service provider 150, third party resource provider 160, cellular communications provider 170, and data storage provider 180. Service provider 150 accesses network 110 via communication link 152, whereas third party resource provider 160 accesses network 110 via communication link 162. Cellular communications provider 170 accesses network 110 via communication link 172 and provides, for example, further connectivity to cellular devices 176 via a cellular network 174. Data storage provider 180 accesses network 110 via communication link 182 to provide, for example, secure backup systems for consumer 120 data. The actual data processing systems of network system 100 may include additional servers, clients, peers, and other devices not illustrated. Each of the service provider 150, third party resource provider 160, cellular communications provider 170, cellular devices 176, and data storage provider 180 can be (or internally provide functions of) the (illustrative) computing device 200 discussed below with reference to FIG. 2.

Figure 2:
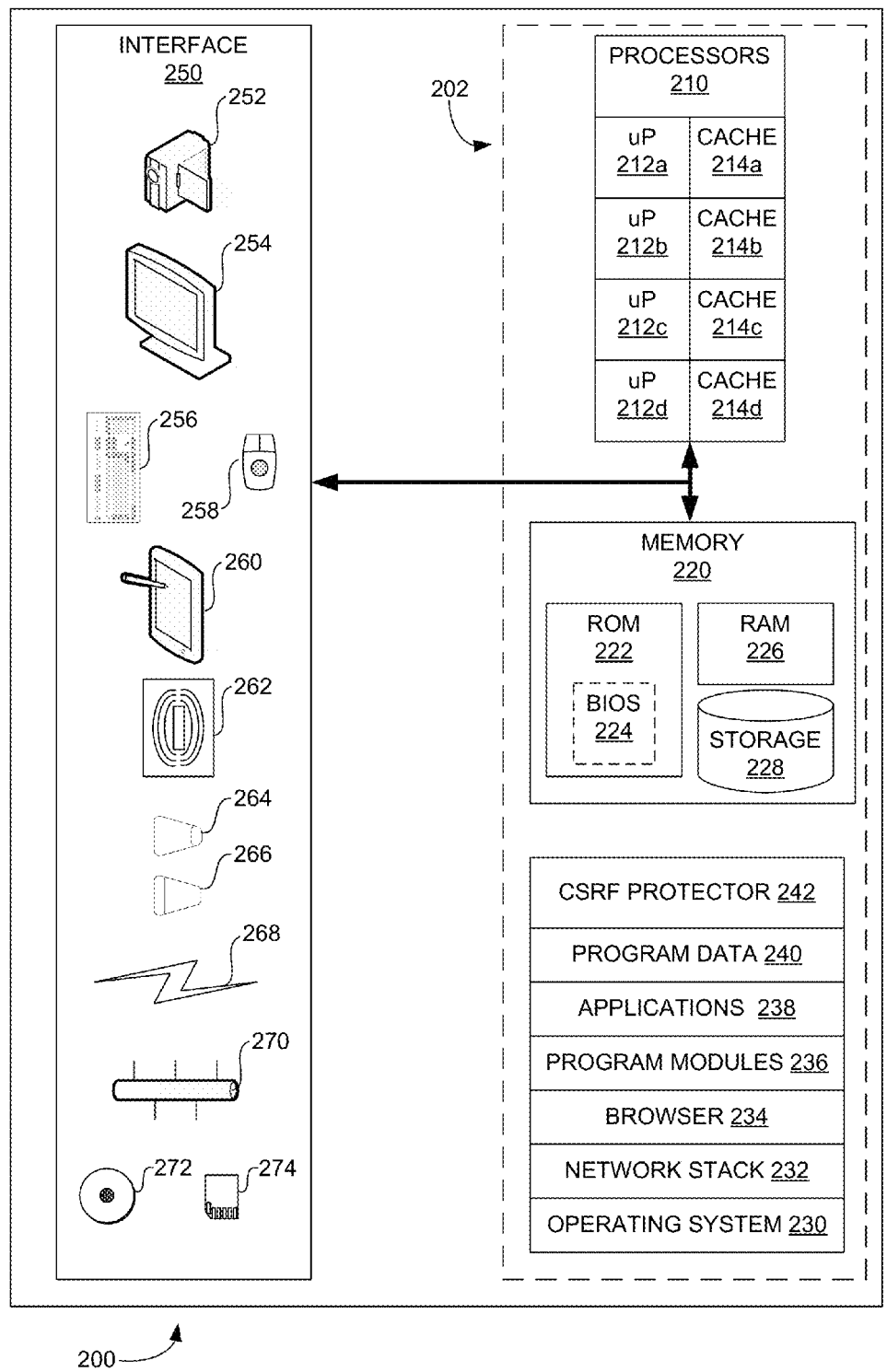
FIG. 2 shows an illustrative computing device in accordance with exemplary embodiments of the disclosure.

FIG. 2 shows an illustrative computing device 200 in accordance with exemplary embodiments of the disclosure. For example, the computing device 200 includes a processing system 202 that is arranged to perform specific tasks in response to applications 238 and program data 240. Processing system 202 is often incorporated into a computing device such as a mobile device, a personal digital assistant, a personal computer, a dedicated web-enabled appliance, a kiosk terminal, automotive electronics, or any other type of networked electronic system or subsystem.

The processing system 202 includes processors 210 and memory 220. Processors 210 may include one or more microprocessor (uP) cores 212a, 212b, 212c, and 212d, each of which is optionally coupled to a respective, local cache 214a, 214b, 214c, and 214d. Memory 220 includes a ROM (read-only memory) 222, RAM (random-access memory) 226, and storage 228 (such as a "hard" disk). ROM 222 optionally includes BIOS (basic input/output system) 224, which typically includes low-level firmware-based drivers for accessing, for example, low-level, hardware-based elements of computing device 200.

Memory 220 includes instructions and data for executing (software) applications 238 (for example), that when executed by processing system 202, perform any suitable function associated with the computing device 200. For example, the processing system 202 executes software (including firmware) and data components such as operating system 230, network stack 232, browser 234, program modules 236, applications 238, program data 240, and CSRF protector 242.

Processing system 202 is accessible to users and non-local components using interface 250. Interface 250 provides a user interface that is typically arranged to provide output to and receive input from the user during the execution of the software applications 238. The output to the user is provided by devices such as the display 254 (including indicator lights and image projectors), a speaker 264, vibrations 262, and the like. The input from the user is received using keyboard 256, mouse (and/or trackball) 258, touch/stylus screen 260, audio input 266 and/or video input 252. Other devices can be used such as keypads, switches, proximity detectors, and the like.

The interface 250 is also arranged to transmit communications to and from other computers across a network. Wireless link 268 permits communications using a modulated optical and/or electromagnetic carrier (such as cellular telephone communications). Cabled link 270 permits communications over a wired and/or optical link (such as optical Ethernet and/or Ethernet). The wireless link 268 and cabled link 270 are optionally employed between other network-enabled devices to establish wide-area networks, local-area networks, private networks, and the like. Additionally, tangible media such as disk 272 or "flash" ROM 274 (and the like) are used to store data and instructions and are read from and/or written to by interface 250 in the course of execution of the CSRF protector 242, for example. The media is or can be non-transitory media.

In exemplary embodiments of the invention, described below, the CSRF (cross-site request forgery) protector 242 of consumer 120 is arranged to inform a browser not to send a request that is likely a CSRF. The CSRF protector 242 is optionally arranged to provide a cross-site request trigger context that surrounds the event that surrounds the triggering of a CSRF request.

Figure 3:
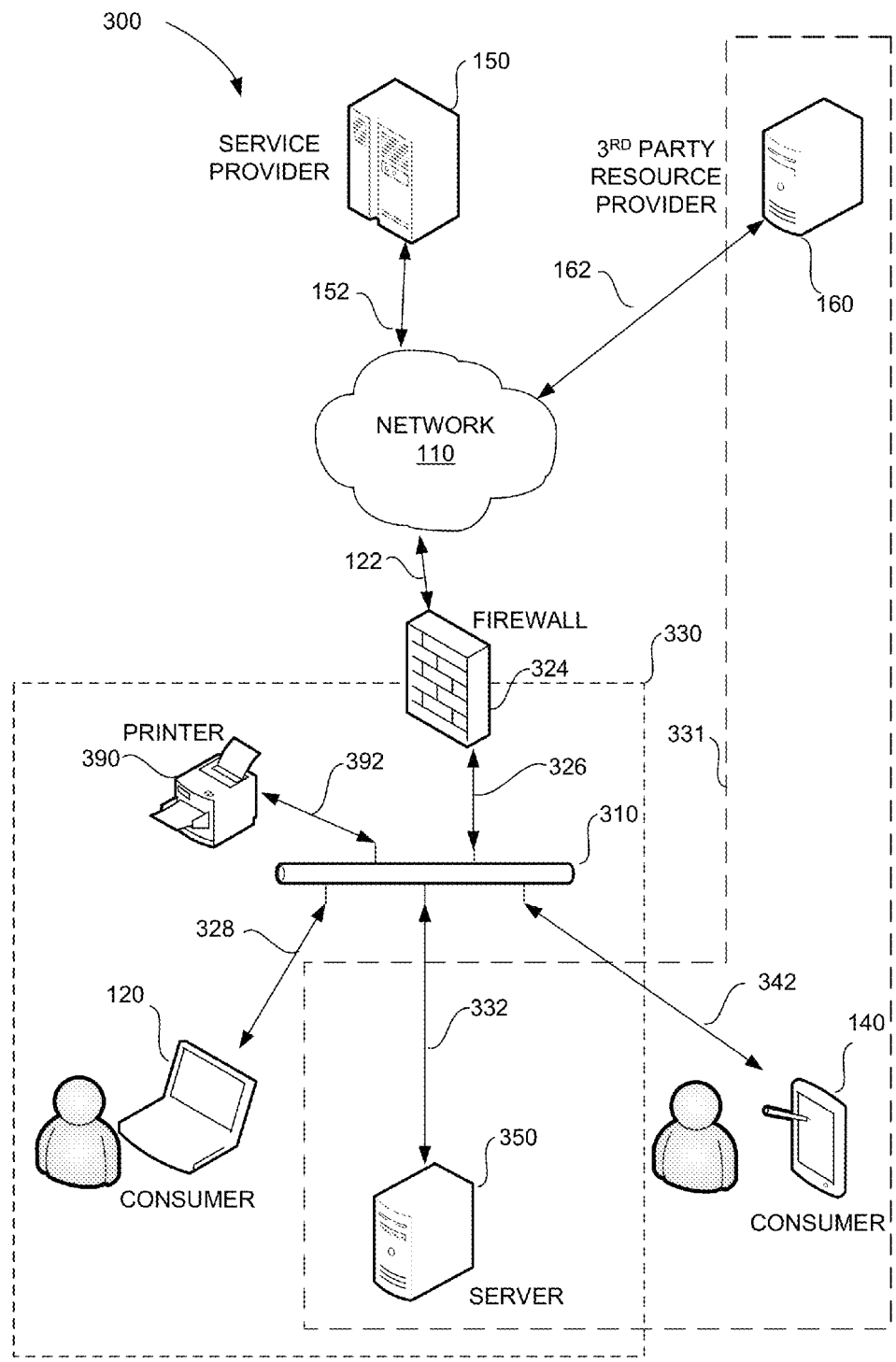
FIG. 3 is a network diagram illustrating in conjunction with FIG. 2 a network that includes cross-site request forgery protection in accordance with exemplary embodiments of the disclosure.

FIG. 3 is a network diagram illustrating in conjunction with FIG. 2 a network that includes cross-site request forgery protection in accordance with exemplary embodiments of the disclosure. Network system 300 includes service provider 150 and third party resource provider 160, as discussed above. Service provider 150 is arranged to provide networked content (such as services, data and/or applications, and the like) to consumer 120 via network 110. The content and services are generally provided in the form of communications such as webpages, where the webpages (and other communications) often contain references (e.g., "links") to "external" resources that are to be provided by the third party resource provider 160 (which is also a networked services provider). The content and services can include banking, information storage, search engines and can be networked via the Internet or private (such as a virtual private network).

Service provider 150 is a server (or a set of servers that are presented as a single server or a "virtual" server for processing requests). The consumers 120 and 140 are typically clients with respect to the server (e.g., service provider 150 and server 350). The consumer 120 and server 350 are networked resources such as, for example, computers that are networked together in a trusted zone 330. A second trusted zone 331 can be arranged having, for example, consumer 140, server 350, and third party service provider 160 in the trusted zone, but excluding consumer 120 from the trusted zone. A trusted zone is an exemplary group of network resources (e.g., "machines") that have trusted communications amongst the network resources of a particular trusted zone (such as trusted zone 330) associated with the network-enabled application.

Trusted zones 330 and 331 are protected against attacks from networked resources (such as third party resource provider 160) by firewall 324, which processes communications from the consumers 120 and 140 across the network 110 by providing network address or port address translation, and/or by providing proxy services. Network 310 provides a link 326 for communicating with the firewall 324, a link 328 for communicating with consumer 120, a link 332 for communicating with server 350, a link 342 for communicating with consumer 140, and a link 392 for communicating with printer 390. For example, the consumers 120 and 140 are arranged as local network resources that are networked together in separate trusted zones using a firewall 324 and/or authentication such that the network resources are otherwise inaccessible to an external attack. A trusted zone can include network resources from within a private address space (that includes consumers 120 and 140, for example) as well as network resources that lie outside of the private address space. Thus, the trusted zone can include network resources from a virtual private network where network resources are securely accessed over a public or private network.

The CSRF protector 242 is arranged to (for example) protect against cross-site request forgeries attacks. As further described below (e.g., with reference to FIG. 4), cross-site request forgeries attacks can be suppressed by the CSRF protector 242 receiving a signal from a service provider (e.g., 150) that notifies a browser running on a victim consumer 120 machine (for example) to selectively permit and/or deny cross-site requests in accordance with a set of one or more security policies. The policies can be selected and applied on a domain name basis, IP address basis, trusted zone basis, and combinations thereof (for example, a policy associated with a domain name can be selected and applied to a trusted zone that includes an IP address that is associated with the domain name).

Alternatively (or in conjunction with the preceding), the CSRF protector 242 can provide a context surrounding the event that triggers a request that contains a cross-site request, where the trigger context provides indicia of circumstances that indicate a likelihood of a cross-site request forgery. For example, the trigger context can include an indication of whether an event originated in an object such as an image tag or "iframe" imbedded in a webpage form).

Accordingly, the CSRF protector 242 can, for example, detect when an attacker's payload attempts to use a loaded element (on a browser running on a victim consumer 120 machine, for example) to take advantage of a network resource that trusts the victim consumer machine. (A payload can be a portion of a communication that is not necessarily used by the protocols used to send the communication, for example.) Thus, a CSRF attack is detected so that appropriate protective actions can be taken (for example) before any potential harm from the attack can occur.

The CSRF protector 242 is variously arranged to initiate taking a protective action such as sending warning signals and/or blocking the attempts by the malicious rendered element (such as rendered element 488, discussed below) to attack another network resource using a cross-site request forgery. The warning signal can be a warning signal that is used for internal (triggering) purposes and/or for purposes of conveying a warning to a related entity such as networked service provider (e.g. 160), user, administrator, security event logger, and the like (and combinations thereof) that conveys the existence (and optionally attributes) of the malicious element. The concerned entity can include a networked service provider (e.g., 150) of the content that includes the rendered element (e.g., 488), a user of the networked-enabled application (e.g., 432, discussed below) that retrieved the rendered element, an administrator of the computer (and/or network) on which the network-application is executing. The attempts by the rendered element to perform a CSRF attack on another network resource (e.g., 350) can be selectively blocked by blocking (including logging, denying, delaying, and the like) the attempts in response to a command by a user, an administrator, a third-party security services provider, and the like that are warned of the malicious element by the warning signal.

Figure 4:
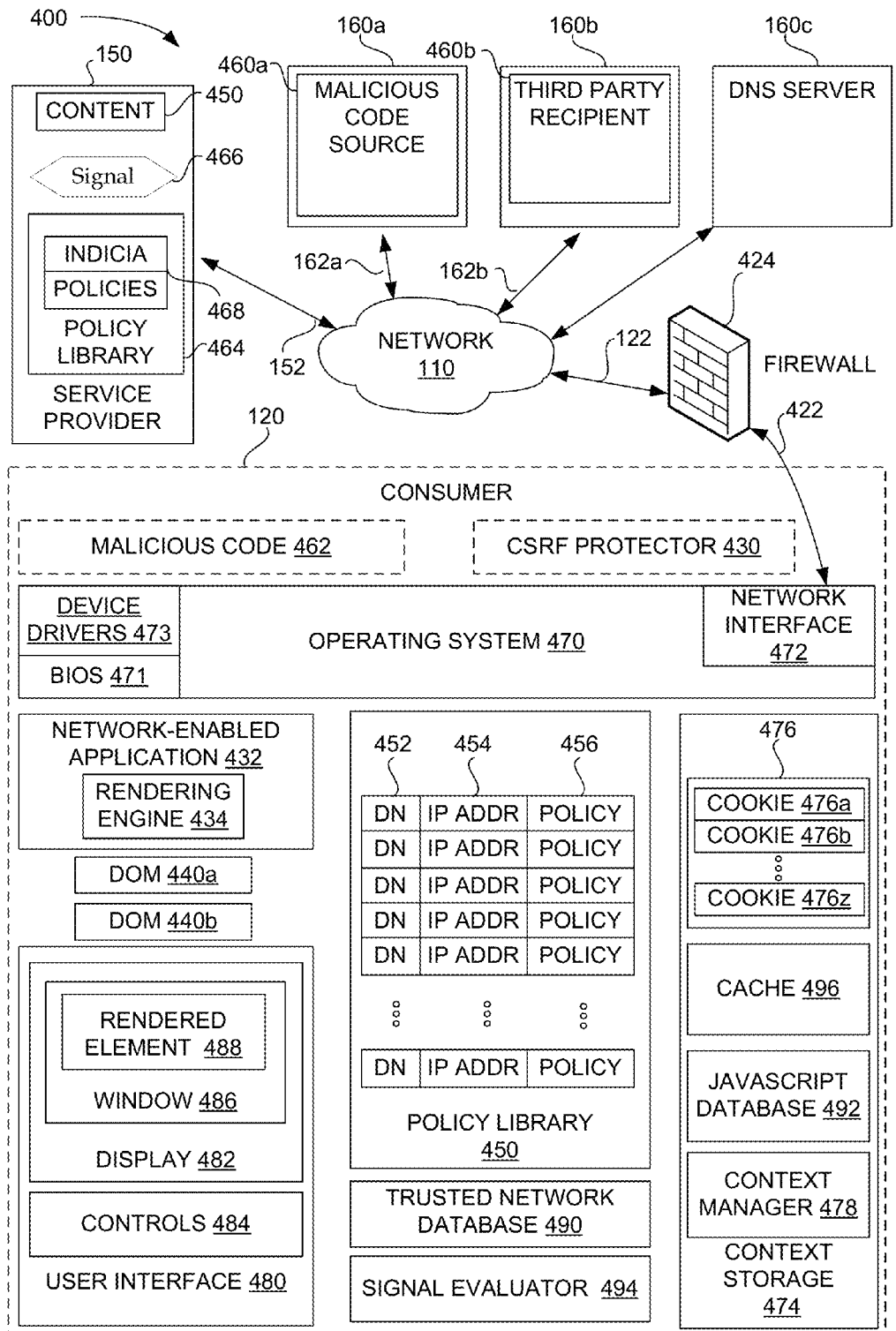
FIG. 4 is a logic diagram illustrating a network resource having a cross-site request forgery protector in accordance with exemplary embodiments of the disclosure.

FIG. 4 is a logic diagram illustrating a network resource having a cross-site request forgery protector 430 in accordance with exemplary embodiments of the disclosure. Network system 400 includes, for example: consumer 120, service provider 150, and third party resource providers 160a, 160b, and 160c. Consumer 120 is arranged to communicate (e.g., securely) with network 110 using communication links 122, firewall 424, and communication link 422. Third party resource providers 160a and 160b are arranged to communicate with network 110 using communication links 162a and 162b respectively.

Consumer 120 typically includes a network-enabled application 432 that is arranged to conduct communications between service provider 150 and consumer 120. For example, network-enabled application 432 includes a browser such as Chrome, Firefox, Internet Explorer, and the like. A user performs an action such as following a bookmark, or clicking on a local link, opening a Word or PDF document, entering a URL (universal resource locator) or IP (Internet protocol) address, or selecting a displayed control to select content 450 (or a portion thereof) hosted by service provider 150, and the like. The selection is relayed by the browser via the network 110 to the addressed service provider (e.g., service provider 150) having the selected content. When an address using a domain name is provided in the communication, a DNS server (e.g., DNS server 160c) is used, for example, to provide an IP address that is used to send the request to service provider 150.

Service provider 150 responds by sending a communication to the consumer 120. The communication is received by the network interface 472 of operating system 470 and the communication is passed to the network-enabled application 432 for decoding and rendering, for example, using a window 486 in the display 482.

The communication is often a webpage written in a markup language, although other formats can be used such as style sheets, JavaScript reference, and the like. The webpage often contains elements that address content provided by the service provider 150 as well as content provided by one or more third party resource providers 160 (such as third party resource providers 160a or 160b). The references in the received communication are, for example, instantiated using a DOM (document object model) 440 as the network-enabled application 432 parses the received communication in accordance with the format used to encode the information encoded in the received communication. The DOM 440 can be arranged as a parent DOM that is associated with one or more children DOMs, wherein each of the DOMs can be associated with a network resource that is determined by the received communication.

As the network-enabled application 432 parses the received communication from the service provider 150, the network-enabled application 432 constructs a DOM 440 (such as DOMs 440a and 440b) that delineates the structure and the function of the encoded information. The DOM 440 is arranged to render both content of requested third party resources (such as third party resources 460b) and local references on the same website, for example. The rendered content can be used to manage a window 486 of a webpage (conveyed by the encoded information) for display in the display 482 (typically via BIOS 471 of the operating system 470). The display 482 is used to provide visual indications to a user and to prompt (e.g., query) the user for input. The user input is captured using controls 484 (such as by a keyboard and/or a mouse) of the user interface 480.

Window 486 is a (e.g., computer program) application window that is arranged to display program output and to help capture user input. Window 486 is, for example, a window of a network-enabled application 432 and is associated with a rendered element 488 that is arranged to be selected by a user using controls 484. The rendered element 488 is included in the received communication by the service provider 150 as a, for example, malicious element that is rendered by rendering engine 434 in accordance with DOM 440a, for example.

In exemplary embodiments of the invention, the consumer 120 includes malicious code 462 that can gain access to the consumer 120 in a number of different ways. For example, the encoded information can include a reference to a resource (such as an apparent advertisement) that is not provided (directly) by the service provider 150. The reference is generally provided in the form of a link (such as a URL or IP address) that is used to retrieve the external reference (third party resources 460 hosted by third party resource provider 160, for example). Even though the external reference might have been approved by the service provider at one time, the external reference is subject to being redirected or even obtained by a beneficiary of the malicious code 462. Thus, the malicious code 462 can be installed by network-enabled application 432 through loading the referenced external reference in the third party resources 460.

The malicious code 462 can contain exploits that target (or attempt to target) vulnerabilities in a session established between a user and a service provider 150. To establish a secured session, a user (operating consumer 120, for example) typically provides user (or other) credentials to be allowed to access the content 450 (including services) on the service provider 150. When the service provider receives the login credentials from the consumer 120 (which indicate the user is a legitimate user of the content 450), the service provider 150 establishes a secure session. After the secured session has been established, the malicious element attempts to initiate a (typical) CSRF attack by sending a malicious payload (containing a cross-site request) from the consumer 120 to the service provider 150.

When the secure session is established, the service provider sends a cross-site warning signal such as a signal 466 (which can be a URL, a code, reserved word, and the like) to the consumer 120 (which is typically before the CSRF attack is initiated). The cross-site warning signal can be communicated as plaintext (e.g., not-encrypted) and can be the same (e.g., time-invariant) signal that is repeatedly sent, for example, to different consumers having different addresses. Thus, cross-site warning signal is typically sent to the consumer 120 after the secure session is established, and is typically not used for authentication. The signal 466 indicates, for example, to the browser (which is a network-enabled application 432) executing on the consumer 120 that a selected policy is to be applied to the generation of requests from the consumer 120 to the service provider 150. The signal 466 can be sent "in-band" (such as a word within a URL or a reserved word received in a communication in the secure session) or "out-of-band" (as a cookie entry in cookies 476, in response to a DNS response from DNS server 160c, email link, and the like). The signal 466 can provide an indication of a location (such as a URL or other address of a receiving service provider 150) to which consumer 120 is to send the request such that the consumer 120, the receiving service provider 150, or both, can apply security policies designed to help frustrate a CSRF attack. The signal 466 can also indicate to the browser to send additional requests (to the service provider 150) seeking further information about what policy (or policies) to apply to a request to the service provider 150. The signal 466 is generated to help, for example, frustrate, detect, identify, modify, and otherwise protect against CSRF attacks.

The signal 466 is received by the signal evaluator 494 and applied to policy library 450 to, for example, determine which (and/or to select which) policy (or policies) for protecting against cross-site request forgery attacks should be applied. Policy library 450 includes records having a domain name (DN) field 452, an internet protocol address (IP ADDR) field 254, and a policy (POLICY) field 456. Accordingly, each record is arranged to store one or more policies concerning a domain name (in DN field 452), the IP address retrieved from a DNS server in response to a query containing the domain name (in IP ADDR field 454), and the policies to be applied (in policy field 456). The policies to be applied (and portions thereof) are optionally selectable in response to information included in trusted network database 490.

One such selected policy indicates that the service provider 150 should not be sent a request that contains a "payload" from a domain that is different from one or more selected domains. For example, a payload generated by a browser of consumer 120 could be formed in response to malicious code 462 from malicious code source 460a of the third party resource provider 160a. The payload can specify that funds from an account (that is controlled by the user of consumer 120) on the service provider 150 are to be sent to a third party recipient 460b of third part resource provider 160b (that is not controlled by the user of consumer 120). Thus, the payload has the potential of "robbing" the user account. When the user browser of consumer 120 receives the indication of the policy to be applied (such as a request that contains a "payload" from a domain that is different from one or more selected domains is not to be generated or sent), the funds of the user of the consumer 120 are restricted from being sent from service provider 150 to unauthorized accounts (by suppressing a cross-site request in a communication generated by consumer 120, for example).

The term domain(s) is used generically with respect to application of security policies and can include a top-level domain, sub-domains, range or ranges or IP addresses, trusted networks, and the like. Thus, the security policy can be used by the browser of consumer 120 to (for example) restrict payloads from transferring the user funds to accounts other than in a trusted network. The trusted network can blacklist the browser from accessing services provided by banks, financial services, bill-paying systems, charities, an "RFC-1918" (request for comments standard 1918) zone and the like with when the browser attempts to (for example) send a request that contains a cross-site reference.

Network entries for the trusted network can be included in the trusted network database 490 on a case-by-case basis in response to a protective action taken in response to a determination that a payload contains (or potentially contains) a link to a network resource that lies outside of the trusted zone. Thus, for example, a (human) user can receive a warning that a payload has been generated to transfer user funds to an (as-of-yet) "unapproved" account on a network resource that lies outside of the trusted zone. Trusted network database 490 is optionally arranged to log accesses for cross-site requests and provide the logged information in response to a call-home event generated in a (actual or suspected) CSRF attack.

Another example of a selected policy indicates that the service provider 150 is to be sent a cross-site request trigger context such as a context of the circumstances surrounding the triggering of a request that contains a "payload" of (e.g., information that is used during later communication that addresses) a domain that is different from one or more domains indicated by a trusted network database (such as trusted network database 490). The context can provide an indication of whether an event was triggered by an event associated with an image tag or "iframe" imbedded in a webpage form. The selected policy can also, for example, send the cross-site request trigger context to an address (such as specified by an IP address, a unique address, a URL, and the like) that is indicated (and/or selected in response to) signal 466.

The context can be evaluated and/or redacted by context manager 478, for example. The context manager 478 consults the DOM (such as DOM 440*a*) associated with the responsible element for generating the request. The context manager 478 is used to identify items in the context storage 474 that are potentially involved in a CSRF attack. The context storage 474 is illustrated as including a JavaScript database 492, cache 496, and cookies 476 (although other context information can be included). The information can be sent to the service provider 150 using, for example, an optional header such as a standard (or a modified) header. The cross-site request forgery protector 430 can direct the context manager 478 to include in the header any information that is used by a network-enabled application (such as a browser or a plugin) to generate the request.

The cross-site request trigger context is received by the service provider 150 and analyzed to determine a degree of the likelihood (e.g., near certain, likely, possible, and the like) a cross-site request is a CSRF attack. The degree of likelihood can be used to determine a policy (or policies) that indicate which preventative actions should be taken. For example, the cross-site request trigger context can include state information (of the DOM, for example) surrounding the generation of the request having a cross-site request in the payload of the request. The cross-site request trigger context can provide (in addition to other such items) an indication of the object responsible for generating the request. In cases where the object responsible for generating the request is an image tag or an iframe (for example), the service provider 150 can make determination that a CRSF is likely or (possibly) can make a determination concerning whether the intent of the programmer of the object appears to be good or bad (and protective action taken accordingly).

The cross-site request trigger context can be sent to another (e.g., mirrored) server (not shown) that operates using the same or different address as the service provider 150 and provides services to (or on behalf of) the service provider 150. The cross-site request trigger context can be sent to a central repository at which the cross-site request trigger context is analyzed and from which elements of the library 464 are promulgated. In exemplary embodiments, the service provider can function as a central repository, and can promulgate library 464 elements and policies to other service providers 150 and various consumers 120.

Appropriate protective action can be taken using a policy library 464 (hosted by the service provider) to compare the cross-site request trigger context (which includes context signatures) with predetermined indicia of CSRF attacks. Table 468 stores specific policies in association with indicia concerning one or more specific CSRF attacks. The predetermined indicia of CSRF attacks can be derived from contexts associated with known CSRF attacks. Thus, a particular CSRF attack can likely be determined by comparing the supplied context (or a signature of the supplied context) with the predetermined indicia and one or more associated policies can be applied so that an appropriate protective action can be taken in accordance with the type of CSRF attack encountered. (The cross-site request trigger context surrounding an indicated CSRF attack can be used to modify—including provisionally modify—the policy library to aid in forensics and speed identification of specific cross-site request addresses, for example.) Policy library (or smaller portions thereof) can be sent to clients of the service provider 150 (such as consumer 120) such that the related processing can be off-loaded to the client.

The service provider 150 can take the appropriate protective actions (such as indicated by the selected policies) and/or transmit policies and/or commands to the consumer 120 so that appropriate protective actions can be taken by the consumer 120, the service provider 150, or both. The protective actions include selectively allowing or blocking (including quarantining) cross-site requests at a user's (and/or administrator's) discretion, blocking requests containing CSRF requests (outright), blocking portions of requests containing CSRF requests, logging and/or providing alerts to users and/or administrators concerning network resources implicated by the CSRF request, and the like.

When a request that contains a cross-site linked payload is being generated (or about to be sent) to the service provider 150 (from which a signal 466 has been received), the CSRF protector 430 is arranged to take a protective action to reduce the risk of a successful CSRF attack. For example, the CSRF protector 430 can produce a warning signal (as discussed above) to notify concerned parties as well as to block or (at least) partially frustrate the attempt by the element responsible generating the request containing the cross-site linked payload.

Network-enabled applications 432 (such as browser engines, messaging interfaces, e-mail tools, remote desktops, and the like) can access functions of the CSRF protector 430 by adding to and/or replacing functionality often provided by the operating system 470. The network-enabled applications 432 can operate (at least to a degree) independently of the operating system 470 (such as by notifying the CSRF protector 430 of each cross-site request sent to the service provider 150 and sending the cross-site request trigger context that led to the potential CSRF attack). Accordingly, a browser application can operate in conjunction with (and/or incorporate features of) the CSRF protector 430. Further, each executing browser application can be associated with its own instance of CSRF protector 430 (e.g., such that multiple CSRF protectors 430 are instantiated).

For example, the CSRF protector 430 can display a notification signal in the window 486 itself, or can generate and send a URL (universal resource link) signal, a DNS (domain name server) signal, or an HTTP (hypertext transfer protocol) header, or HTML (hypertext markup language) tag. Also, a modal dialog (that is similar to, e.g., an alert dialog) that pops up (or is otherwise brought into view) above the window itself can be used to display the notification signal and related forensic attributes as discussed above. Audible notifications signals can also be generated.

Figure 5:
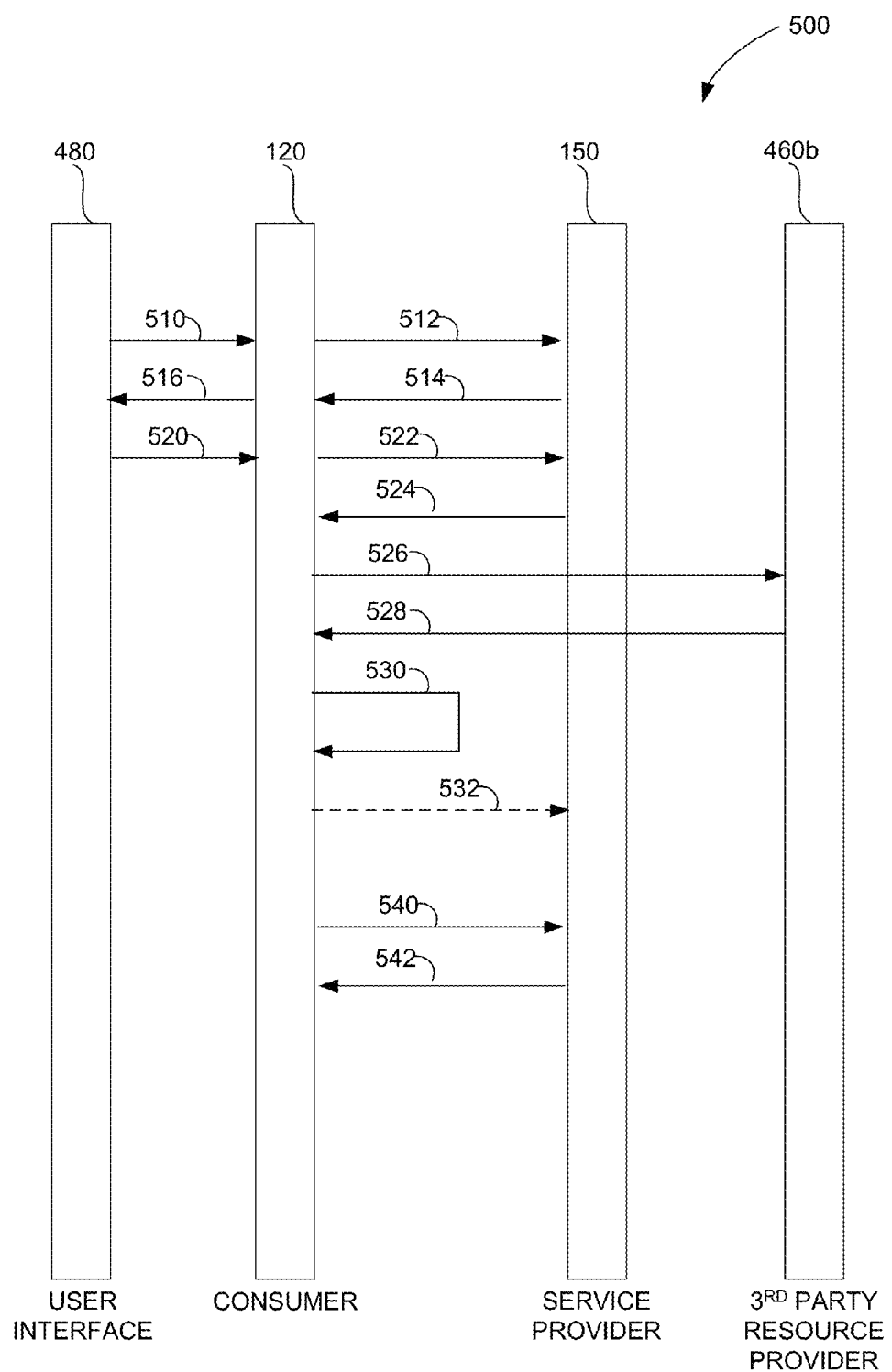
FIG. 5 is a signaling diagram illustrating in conjunction with FIG. 4 operation of a cross-site request forgery protection architecture in accordance with exemplary embodiments of the disclosure.

FIG. 5 is a signaling diagram illustrating in conjunction with FIG. 4 operation of a cross-site request forgery protection architecture in accordance with exemplary embodiments of the disclosure. Signaling diagram 500 illustrates communications transmitted and received between and amongst the user interface 480, for example, consumer 120, service provider 150, and (e.g., malicious) third party resources 460b. A user at user interface 480 sends a command 510 via an external network to consumer 120 to (eventually) generate a request 512 for content (or other services) from service provider 150. In response, service provider 150 transmits via the external network a communication 514 that includes an object (such as rendered element 488) for requesting and receiving sensitive information from the user at user interface 480. The sensitive information can include credential information such as a login identifier, a nonce (e.g., a one-time security token), a password, and the like.

When the communication 514 is received and parsed (for example), consumer 120 constructs (for example) a DOM 440. The DOM 440 is rendered and the results are sent via communication 516 to user interface 480 for display in window 486. A user at user interface 480 can supply the sensitive information to establish (for example) a secure session with service provider 150 via command 520. The consumer 120 then forwards the sensitive information to the service provider 150 using communication 522. In some exemplary embodiments, a contextual element (such as a cookie and/or nonce) provides contains the sensitive information. In other exemplary embodiments, a user can supply the sensitive information using a sensitive input field such as rendered element 488 to issue a command that causes the sensitive information to be sent to the service provider 150.

Upon receiving the sensitive information from the consumer 120, the service provider 150 responds with communication 524, which indicates (for example) that a secure session has been established. As disclosed herein, the service provider 150 transmits a cross-site request warning signal (such as signal 466 illustrated in FIG. 4) via communication 524. Upon receiving the communication 524 (that includes the cross-site request warning signal), the consumer 120 parses the communication 524 and updates the DOM 440 in response. (As discussed above, the cross-site request warning signal can be sent "in-band," and/or "out-of-band.")

As an example of how the consumer 120 can obtain malicious code (that is intended to exploit the established secure session), the consumer 120 generates a request 526 to the third party resource 460b. In response to the request 526, the third party resource 460b generates a communication 528 that returns malicious code that (for example) contains a cross-site reference.

In the example, the malicious code is instantiated as malicious code 462 on the consumer 120. The malicious code 462 may then attempt to create a CSRF attack, e.g., by attempting to induce the consumer 120 to send a malicious communication 532 to the service provider 150. The malicious communication 532 can be created with the intention of requesting the service provider 150 to provide content (and/or funds) that belongs to the user (having an account on service provider 150, for example) to another person (such as a "hacker" that controls an account on third party resource 460b or on other networked resource). Thus, the malicious communication 532 is created with the intent of inducing the service provider 150 to provide unauthorized access to the users account on the service provider 150.

In an exemplary embodiment, the CSRF protector 430 (e.g., in response to signal 524) is configured to detect the cross-site reference of the malicious communication 532, and queries (via query 530) the policy library 450 for an indication of a policy associated with the service provider 150. The indicated policy (such as a policy stored in a policy field 456 associated with the service provider 150) can be used to determine a protective action to take in response to the detection of the malicious signal 532.

The protective action can also be determined in part or in the main in response to the cross-site warning signal itself (e.g., signal 466). The policy, for example, can be that the service provider should not be sent a cross-site request (e.g., where the cross-site request references a domain or IP address that is different from a domain that is associated with which the user 120 or the service provider 150). Upon detecting the cross-site request, a protective action is taken by the CSRF protector 430 to frustrate the intent of the communication that contains the cross-site request (as a payload) by intercepting, blocking, and/or rendering harmless the (potentially) malicious communication 532. For example, the potentially malicious communication can be frustrated by instructing the browser on the consumer 120 to not send the malicious communication 532 to the service provider 150), which thus prevents the CSRF request from being executed by the service provider 150.

In another exemplary embodiment, the CSRF protector 430 detects the cross-site request of the (potentially) malicious communication 532, the consumer 120 sends (e.g., in communication 540) to the service provider 150 the cross-site request trigger context surrounding the event that triggered the malicious communication 532. The cross-site request trigger context can include, for example, the existence of the cross-site request in the payload of the malicious communication 532, the origin of the malicious communication 532 (such as which browser object is responsible for triggering the generation and/or triggering of the malicious communication 532), the third party destination, and/or supplemental related information supplied by context manager 478. The cross-site request trigger context can be used by the service provider 150 to deny service to consumer 120 (thus protecting the accounts associated with consumer 120), supply a security policy (via communication 542, for example) for consumer 120 to apply (for handling cross-site requests), extract forensic information to be used to reduce future CSRF attacks from a revealed context (in a fashion similar to virus detection), and the like.

In various exemplary embodiments, the protective actions taken by consumer 120 (in response to the detection of a cross-site request in the malicious communication 532, for example) can take a variety of forms. For example, the communication including the cross-site request can be blocked from being sent to the service provider 150. In another example, a portion of the payload of the communication including the cross-site request can be removed from the communication being sent to the service provider 150. In yet another example, a portion of the payload of the communication including the cross-site request can be modified to render the portion of the payload relatively harmless before sending the communication to the service provider 150. In another similar example, the request can provide a warning that the request contains potentially hazardous payload (such as a cross-site request) so the service provider can selectively take appropriate action. In yet another similar example, the request can provide the cross-site request trigger context concerning the generation of the cross-site request so the service provider can selectively take appropriate action. The appropriate action taken by the consumer 120 can also include providing a notification of a potential CSRF attack (in response to a warning signal, for example) to a user, an administrator, a third-party security services provider, and the like associated with the consumer 120 and receiving a command from the notified user, an administrator, a third-party security services provider, and the like (associated with the consumer 120, for example) that specifies a user-requested protective response.

The service provider 150 can take appropriate action by, for example, performing one or more of the following actions: logging the cross-site request, denying the cross-site request, delaying the cross-site request, deleting the cross-site reference from the request, determining whether the cross-site request accesses an address of a predetermined resource (such as a resource that is described in a list and/or database), selectively allowing or denying the request based upon whether the cross-site request accesses the address of the predetermined resource, and selectively allowing or denying the request based upon whether the received cross-site request trigger context indicates a substantial likelihood of a cross-site request forgery attack (such as determined by heuristically comparing elements of the received cross-site request trigger context with information stored in table 468). The appropriate action taken by the service provider 150 can also include providing a notification of a potential CSRF attack (in response to a warning signal, for example) to a user, an administrator, a third-party security services provider, and the like and receiving a command from the notified user, an administrator, a third-party security services provider, and the like (associated with the service provider 150, for example) that specifies a user-requested protective response.

Accordingly, as disclosed herein, useful cross-site requests (such as third party banner advertising) can be generally permitted in a computing environment that automatically and/or selectively prohibits malicious attacks using a CSRF attack. While enforcing the policy of preventing all cross-site requests can substantially eliminate CSRF attacks, such an (e.g., extreme) policy also prevents third-party advertisements (for example), which would inhibit revenues derived from the advertisers.

Figure 6:
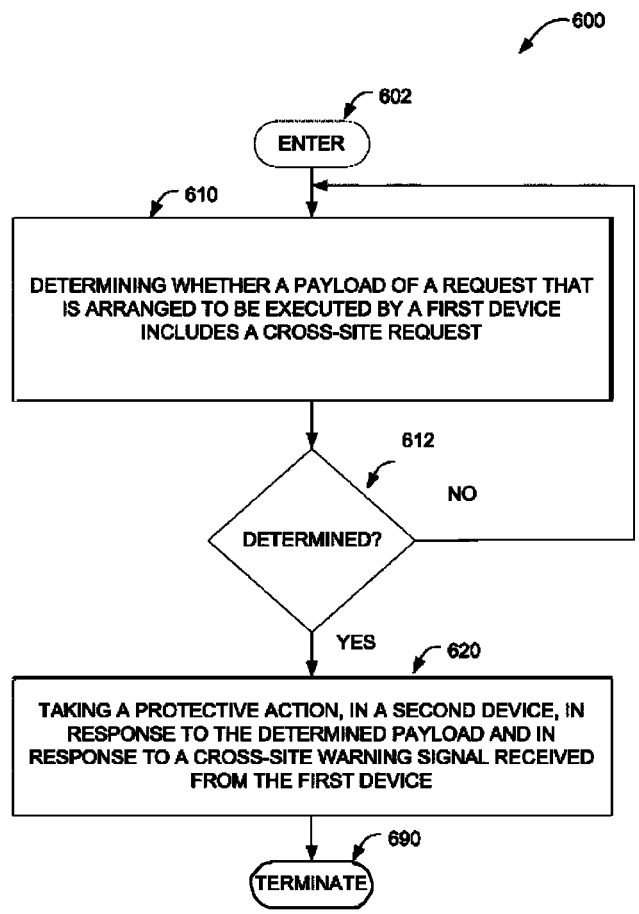
FIG. 6 is a flow diagram illustrating cross-site request forgery protection architecture in accordance with exemplary embodiments of the disclosure.

FIG. 6 is a flow diagram illustrating cross-site request forgery protection architecture in accordance with exemplary embodiments of the disclosure. The program flow illustrated herein is exemplary, and thus various operations (and various portions of the operations) within the program flow can be performed concurrently and/or in an order that is not necessarily the same as the program flow illustrated herein (including, for example, using logical substitutions and reordering made in accordance with DeMorgan's theorems and Boolean algebra). Program flow 600 begins at node 602 and proceeds to operation 610.

In operation 610, it is determined whether a payload of a request that is arranged to be executed by a first device (such as a service provider) includes a cross-site request. For example, the determination can be used to preempt an attempt to perform a CSRF attack on the first device. Program flow proceeds to operation 612

In operation 612, the result of the payload determination is evaluated. If the determination is made that the payload for a request to a first device includes a cross-site request, program flow proceeds to operation 620. If the determination is not made that the payload for a request of a first devices includes a cross-site request, program flow proceeds to operation 610, where another payload is evaluated.

In operation 620 a protective action is taken in a second device (such as a consumer) in response to the determined payload and in response to a cross-site warning signal received from the first device (such as the service provider). For example, the protective action can include removing the payload (which includes the meaning of "deletion of a portion of the payload that is less than the entire portion of the payload") that would otherwise be required for the CSRF to succeed. Also, for example, the cross-site warning signal can be received before the payload is formed for the request to the service provider.

The various exemplary embodiments described above are provided by way of illustration only and should not be construed to limit the claims attached hereto. Those skilled in the art will readily recognize various modifications and changes that could be made without following the example exemplary embodiments and applications illustrated and described herein, and without departing from the true spirit and scope of the following claims.

The invention claimed is:

1. A method, comprising:
receiving, from a server, a cross-site request forgery (CSRF) warning signal that is associated with a service provider and is arranged to notify consumers the service provider provides services that are to be protected against cross-site request forgery-related exploits, wherein the CSRF warning signal includes an indication of an address to which a request, which is arranged to be executed by the service provider, is to be sent by the consumer side;
determining, in a consumer side, whether the request, which is generated during a secure session between a consumer of the consumer side and the server, is arranged to be executed by a service provider and comprises a cross-site request that is cross-sited with respect to a server website with which the secure session is established; and
taking a protective action, in the consumer side, in response to the determined cross-site request and in response to the cross-site request forgery warning signal received from the service provider, wherein the protective action includes blocking a portion of the cross-site request from being transmitted from the consumer to the server.

2. The method of claim 1, wherein a network-enabled application executing on the consumer side includes a document object model (DOM) that generates the request that is arranged to be executed by the service provider, and the protective action is taken by a process executing on the consumer.

3. The method of claim 2, wherein the server is the service provider, and wherein the server website is hosted by the server.

4. The method of claim 3, wherein the service provider is arranged to send the CSRF warning signal to the consumer side in response to a secure session being established between the service provider and the consumer side.

5. The method of claim 1, wherein the protective action includes blocking the cross-site request from being sent to the service provider.

6. The method of claim 5, wherein the cross-site request is selectively blocked from being sent to the service provider in response to a policy selected in response to the CSRF warning signal.

7. The method of claim 6, wherein the selected policy is selected from a list of policies stored on the consumer side.

8. The method of claim 5, wherein the protective action is taken in response to an input of the consumer side received from a user that is notified of the determined cross-site request.

9. The method of claim 5, comprising determining whether the cross-site request references a network resource that lies outside of a trusted zone that includes the consumer side.

10. The method claim 1, wherein the protective action includes sending a cross-site request trigger context of the generation of the cross-site request.

11. The method of claim 10, wherein the cross-site request trigger context is sent in response to the CSRF warning signal.

12. The method of claim 11, wherein the cross-site request trigger context provides an indication of the type of object from which the request that is arranged to be executed by the service provider was triggered.

13. The method of claim 12, comprising taking the protective action in the service provider in response to a cross-site address of the determined cross-site request and in response to the indication of the type of object from which the request that is arranged to be executed by the service provider was triggered.

14. The method of claim 10, comprising sending indicia of cross-site request forgery attacks to clients of the service provider.

15. The method of claim 12, wherein the cross-site request trigger context is sent to an address selected in response to an address indicated by the CSRF warning signal.

16. A non-transitory, tangible medium including instructions that, when executed on a processor of an electronic system, comprise:
receiving, from a server, a cross-site request forgery (CSRF) warning signal that is associated with a service provider and is arranged to notify consumers the service provider provides services that are to be protected against cross-site-related exploits, wherein the CSRF warning signal includes an indication of an address to which a consumer request, which is arranged to be executed by the service provider, is to be sent by the consumer side;
determining, in a consumer side, whether the consumer request, that is generated during a secure session between a consumer of the consumer side and the server, is arranged to be executed by a service provider and includes a cross-site request that is cross-sited with respect to a server website with which the secure session is established; and
taking a protective action in response to the determined cross-site request and in response to a cross-site warning signal received from the service provider, wherein the protective action includes blocking a portion of the cross-site request from being transmitted from the consumer to the server.

17. The medium of claim 16, wherein the server is the service provider.

18. The medium of claim 17, comprising sending a cross-site request trigger context to the service provider in response to the CSRF warning signal.

19. The medium of claim 18, comprising comparing the cross-site request trigger context with predetermined indicia of cross-site request forgery attacks.

20. The medium of claim 19, wherein the cross-site request trigger context includes information concerning an object in the consumer side that triggers a generation of the cross-site request.

21. A web browsing system, comprising:
a memory including data of a signal evaluator that is arranged to determine whether a cross-site request forgery (CSRF) warning signal has been received, wherein the CSRF warning signal is associated with a service provider and is arranged to notify consumers the service provider provides services that are to be protected against cross-site-related exploits, and wherein the CSRF warning signal includes an indication of an address to which a request, which is arranged to be executed by the service provider, is to be sent by the consumer side; and
a processor arranged to execute instructions of a CSRF protector that is arranged to generate, during a secure session between a consumer of the consumer side and the service provider, the request that is to be executed by the service provider, and arranged to determine whether the request is a cross-site request that is cross-sited with respect to a server website with which the secure session is established, and wherein the processor is arranged to take a protective action that includes blocking a portion of the cross-site request from being transmitted from the consumer to the service provider.

22. The system of claim 21, wherein the CSRF protector is arranged to determine whether the request that is to be executed comprises a cross-site request that includes a payload for exploiting the trust the service provider has with a network-enabled application that is used to establish the secure session.

23. The system of claim 22, wherein the signal evaluator is arranged to determine whether a URL provided by the service provider contains an indication of the CSRF warning signal.

24. The system of claim 22, wherein the CSRF warning signal is a non-encrypted signal received via the service provider, a domain name system (DNS) server, or both.

25. The system of claim 24, wherein the protective action includes blocking the cross-site request from being sent to the service provider.

26. The system of claim 25, wherein the cross-site request is selectively blocked from being sent to the service provider in response to a policy selected from a policy library in response to the CSRF warning signal.

27. The system of claim 26, wherein the selected policy is selected in response to determining whether the cross-site request is arranged to address a third party device that lies outside of a trusted network having addresses stored in a trusted network database.

28. The system of claim 24, wherein the protective action includes sending cross-site request trigger context of the generation of the cross-site request.

29. The system of claim 28, wherein the cross-site request trigger context is sent in response to receiving the CSRF warning signal.

30. The system of claim 29, wherein the cross-site request trigger context provides an indication of the type of object from which the request was triggered.

* * * * *